United States Patent [19]
Ash et al.

[11] Patent Number: 5,334,701
[45] Date of Patent: Aug. 2, 1994

[54] PROCESS FOR THE REMOVAL OF LOWER MOLECULAR WEIGHT FRACTIONS OF POLY(ARYLENE SULFIDE) POLYMERS

[75] Inventors: Carlton E. Ash, Sugarland, Tex.; Jon F. Geibel; Randy L. Hagenson, both of Bartlesville, Okla.; David A. Soules, Middletown, R.I.

[73] Assignee: Phillips Petroleum Company, Bartlesville, Okla.

[21] Appl. No.: 965,489

[22] Filed: Oct. 23, 1992

[51] Int. Cl.$^5$ ............................... C08G 75/14
[52] U.S. Cl. ..................... 528/486; 528/388; 528/487; 528/490; 528/492; 528/495; 528/499
[58] Field of Search ............... 528/486, 499, 490, 492, 528/495, 487, 388

[56] References Cited
U.S. PATENT DOCUMENTS

| | | | |
|---|---|---|---|
| 4,748,231 | 5/1988 | Nesheiwat | 528/486 |
| 4,801,664 | 1/1989 | Nesheiwat et al. | 528/486 |
| 4,960,861 | 10/1990 | Kotera et al. | 528/388 |
| 5,098,992 | 3/1992 | Nesheiwat | 528/486 |
| 5,128,445 | 7/1992 | Scoggins et al. | 528/492 |

Primary Examiner—John Kight, III
Assistant Examiner—T. Mosley
Attorney, Agent, or Firm—Beverly M. Dollar

[57] ABSTRACT

A method is provided for selectively extracting the lower molecular weight fraction of a poly(arylene sulfide) polymer by contacting the polymer with a polar organic compound and a promoter compound to form a less dense polymer-lean liquid phase and a more dense polymer-rich liquid phase, separating the polymer-lean liquid phase from the polymer-rich liquid phase, and recovering the polymer from the polymer-rich phase. Alternatively, either of the phases can be isolated and polar organic compound and optionally promoter can be added to form two new phases, followed by isolation of the new polymer-rich phase. This process can be repeated as often as desired or practicable in order to recover polymer having a desired molecular weight and/or molecular weight distribution.

10 Claims, 10 Drawing Sheets

PROCESS FOR THE REMOVAL OF LOWER MOLECULAR WEIGHT FRACTIONS OF POLY(ARYLENE SULFIDE) POLYMERS

BACKGROUND OF THE INVENTION

This invention relates to a method for removing lower molecular weight fractions of a poly(arylene sulfide) polymer and the composition produced thereby. More particularly, in a more preferred aspect, this invention pertains to removal of essentially all oligomers and non-polymeric impurities from a poly(phenylene sulfide) polymer and the composition produced thereby.

Poly(arylene sulfide) polymers are known in the art and have found wide use due to their desirable thermal and chemical resistance. Poly(arylene sulfide) polymers are useful in the formation of films, fibers, composites and molded parts by a variety of methods known to those of skill in the art.

Lower molecular weight fractions of poly(arylene sulfide) polymers, including oligomers and polymerization-by-products may contribute to certain processing and final product problems. Problems attributed to high oligomer concentrations in the polymer include mold plate out, die face build up, exhaust duct fouling, bubble formation in molded parts, corrosion, injection molding drool and off-gassing during injection molding, reduced mechanical properties and decreased weld line strength in parts having a weld line. Solvent extraction methods have been used to remove some of the oligomers from poly(phenylene sulfide) products, but a detrimental oligomer concentration usually remains after extraction. Thus, there still exists a need for an improved oligomer and non-polymeric impurity removal technique.

SUMMARY OF THE INVENTION

An object of this invention is to minimize the oligomers and non-polymeric impurities in a poly(arylene sulfide) polymer.

Another object of this invention is to provide a method of selectively removing lower molecular weight fractions from a poly(arylene sulfide) polymer.

According to this invention, a poly(arylene sulfide) polymer is contacted with a polar organic compound and at least one promoter compound selected from the group consisting of an alkali metal halide which is soluble in said polar organic compound, an alkali metal carboxylate, water, and mixtures thereof, at a temperature sufficient to form a less dense liquid phase containing a portion of the lower molecular weight fraction of the poly(arylene sulfide) polymer, oligomers and impurities (polymer-lean phase), and a more dense liquid phase containing essentially all of the higher molecular weight fraction of the poly(arylene sulfide) polymer, and the remaining portion of the lower molecular weight fraction of the poly(arylene sulfide) polymer, oligomers and impurities (polymer-rich phase). Then the less dense and more dense phases can be separated and the higher molecular weight poly(arylene sulfide) polymer recovered from the more dense phase directly, or the more dense phase can be contacted with additional polar organic compound, and optionally additional promoter in order to form two new phases. The less dense and more dense phases can again be separated, thus removing another portion of the lower molecular weight fraction of the poly(arylene sulfide) polymer, oligomers and impurities. The process can be repeated as desired until the desired amount of lower molecular weight poly(arylene sulfide) polymer, oligomers and impurities has been removed.

DETAILED DESCRIPTION OF THE PREFERRED EMBODIMENTS

In first embodiment of this invention, a poly(arylene sulfide) polymer is contacted with a polar organic compound and a promoter which is at least one of an alkali metal halide which is soluble in the polar organic compound, an alkali metal carboxylate, and water, at a temperature sufficient to form a less dense polymer-lean liquid phase and a more dense polymer-rich liquid phase, then the phases are separated from each other and the polymer is recovered from the more dense polymer-rich phase.

For convenience, the less dense phase will hereinafter be referred to as the "upper" phase and the more dense phase will be referred to as the "lower" phase. The lower phase contains essentially all of the high molecular weight polymer and a portion of the lower molecular weight polymer, oligomers and other impurities. The upper phase contains the remainder of the lower molecular weight polymer, oligomers and impurities. The molar ratio of the polar organic compound to water, if employed, is similar in the upper and lower phases.

The formation of, and relative volume of the two phases depends on several factors. The molecular weight of the starting poly(arylene sulfide) polymer is one factor. Higher molecular weight poly(arylene sulfide) polymers more easily form two phases when placed in the polar organic compound/promoter mixture. Higher molecular weight poly(arylene sulfide) polymers cause the formation of more concentrated lower liquid phases; that is, high molecular weight polymer exists in a smaller volume of polar organic compound/promoter mixture, relative to the volume of the polar organic compound/promoter mixture in the upper phase.

The type and amount of promoter used affects the formation of the two phases. If water is employed as the promoter, generally the addition of a greater amount of water aids in the formation of the two phases. If water and another promoter such as an alkali metal carboxylate are both present, less water is necessary to cause the formation of the two phases than when the second promoter is not present. Certain alkali metal carboxylates, notably lithium benzoate, aid in the formation of two phases without any water being present.

The formation of the two phases is also affected by temperature. While higher temperatures aid in the dissolution of solid polymer in the polar organic compound, lower temperatures appear to aid two phase formation. The temperature should remain below that at which the polar organic compound and/or promoters, polymers, oligomers and impurities decompose or vaporize, at the pressure employed. Generally, temperatures in the range of about 200°–300° C., preferably 220°–280° C., most preferably 230°–270° C., are employed.

The poly(arylene sulfide) polymers useful in this invention can be made by any method known to those of ordinary skill in the art.

Examples of poly(arylene sulfide) polymers useful in this invention are those prepared according to U.S. Pat. No. 3,919,177, U.S. Pat. No. 3,354,129, U.S. Pat. No. 4,038,261, U.S. Pat. No. 4,038,262, U.S. Pat. No. 4,116,947, U.S. Pat. No. 4,282,347 and U.S. Pat. No. 4,350,810, which patents are hereby incorporated by reference. The poly(arylene sulfide) polymers generally are prepared by contacting reactants comprising a dihalosubstituted aromatic compound, a sulfur source and a polar organic compound under polymerization conditions. Those polymers which were initially polymerized to relatively high molecular weight may also be prepared using alkali metal carboxylates or other molecular weight modifying agents and/or polyhaloaromatic compounds during polymerization.

Specific examples of poly(arylene sulfide) polymers suitable for purposes of this invention include poly(2,4-toluene sulfide), poly(4,4'-biphenylene sulfide) and poly(phenylene sulfide). Because of its availability and desirable properties (such as high chemical resistance, non-flammability, and high strength and hardness) poly(phenylene sulfide) is the presently preferred poly(arylene sulfide).

It is also within the scope of this invention to employ poly(arylene sulfide) polymers containing other groups such as sulfone, sulfoxide, ketone, ether and biphenyl in the polymer backbone.

While it is preferred to employ a relatively high molecular weight poly(arylene sulfide) in this invention, the poly(arylene sulfide) polymer can be of either relatively high or relatively low molecular weight.

The poly(arylene sulfide) initially can be polymerized to relatively high molecular weight by the process described in U.S. Pat. No. 3,919,177, or by any other process known to those of ordinary skill in the art which produces a high molecular weight poly(arylene sulfide) polymer. The preferred high molecular weight poly(arylene sulfide) for use in this invention is poly(phenylene sulfide). The melt flow of the high molecular weight poly(phenylene sulfide) is generally less than about 3,000 g/10 min.

The relatively low molecular weight poly(arylene sulfide) can be prepared by the process of U.S. Pat. No. 3,354,129, but any process which produces a relatively low molecular weight poly(arylene sulfide) is acceptable. The preferred relatively low molecular weight poly(arylene sulfide) is poly(phenylene sulfide). The melt flow of the relatively low molecular weight poly(phenylene sulfide) is generally about 3,000 to about 30,000 g/10 min.

The polar organic compounds useful in this invention are those in which the poly(arylene sulfide) polymer, oligomers and impurities are soluble. The polar organic compound should be miscible with water and/or be a solvent by itself or when mixed with water for the alkali metal carboxylate or alkali metal halide used to promote phase separation. The polar organic compound need not be a solvent for the alkali metal halide produced as a by-product during the polymerization. The polar organic compound should be chosen to be liquid at the pressures and temperatures employed in this invention.

Suitable polar organic compounds include organic amides, such as, for example lactams; high boiling alcohols; ethers; ketones; and sulfones. It is presently preferred to employ an organic amide as the polar organic compound. Suitable organic amides include, but are not limited to, N,N'-ethylene dipyrrolidone, N-methyl-2-pyrrolidone (NMP), N-methyl-caprolactam, N-ethyl-caprolactam, caprolactam, pyrrolidone, 1,3-dimethyl-2-imidazolidinone, tetramethyl urea, hexamethylphosphoramide, and N,N'-dimethylacetamide. It is presently most preferred to use NMP as the polar organic compound.

Any amount of polar organic compound can be employed which is sufficient to result in the formation of a solution. In other words, enough polar organic compound must be present to allow the poly(arylene sulfide) polymer, oligomers and impurities to dissolve. Generally, this amount will be in the range of 2:1 to 25:1 moles of polar organic compound per mole of sulfur in the polymer. At polymer concentrations above about 0.5 moles of sulfur in the polymer per mole of polar organic compound, it is generally more difficult to form two easily separable phases.

The amount of water used, if water is employed as a promoter, will generally be that amount necessary to aid in the formation of the two phases. As previously discussed, the amount of water used will vary according to other factors such as the molecular weight of the poly(arylene sulfide) to be treated according to this invention, the temperature of the poly(arylene sulfide) solution in the polar organic compound, the concentration of the polymer in the polar organic compound and the presence or absence of other promoter compounds. Broadly speaking, the amount will be about 0.2 to about 10 moles of water per mole of sulfur in the polymer.

Alkali metal carboxylates that can be employed in the process of the invention can be represented by the formula $R'CO_2M$ where $R'$ is a hydrocarbyl radical selected from alkyl, cycloalkyl, aryl and combinations thereof such as alkaryl, aralkyl, and the like. The number of carbon atoms in said $R'$ is within the range of about 1 to about 20 and M is an alkali metal selected from lithium, sodium, potassium, rubidium, and cesium.

Examples of some alkali metal carboxylates that can be employed in the process of the invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyl octanoate, potassium dodecanoate, rubidium 4-ethyl tetradecanoate, sodium octadecanoate, sodium heneicosanoate, lithium cyclohexane carboxylate, cesium cyclododecane carboxylate, sodium 3-methyl cyclopentane carboxylate, potassium cyclohexylacetate, potassium benzoate, lithium benzoate, sodium benzoate, potassium m-toluate, lithium phenyl acetate, sodium 4-phenyl cyclohexane carboxylate, potassium p-tolyl acetate, lithium 4-ethyl cyclohexyl acetate and the like and mixtures thereof.

While any amount of alkali metal carboxylate can be used that is sufficient to promote the formation of two phases, an amount within the range of about 0.01 to about 2 moles of alkali metal carboxylate per mole of sulfur in the polymer will generally be used when the alkali metal carboxylate is employed with water. When certain alkali metal carboxylates are employed as promoters without water, the amount employed will also generally be in the range of about 0.01 to about 2 moles of alkali metal carboxylate per mole of sulfur in the polymer.

The alkali metal halides useful in this invention are those which are soluble in the polar organic compound or can be made soluble in a mixture of the polar organic compound and another promoter compound. For example, lithium chloride is useful as a promoter compound since it is soluble in certain polar organic compounds, such as, for example, NMP. In contrast, sodium chloride, when placed in NMP, is insoluble and thus not useful by itself as a promoter.

During the polymerization process, by-products can be produced which are insoluble in the polar organic compound used in this invention, such as, for example, the alkali metal halide by-product. In these circumstances, in order to form two separate and discreet liquid phases which can be more easily separated according to conventional methods, it is desirable that the majority of the insoluble alkali metal halide formed as a by-product of the poly(arylene sulfide) polymerization be removed.

Preferably, the polymerization reaction mixture is subjected to a process to remove the by-product alkali metal halide, such as for example, washing the polymer particles with a compound in which the alkali metal halide is soluble but in which the polymer is not soluble. For example, sodium chloride by-product can be removed from a poly(phenylene sulfide) polymer produced as described in U.S. Pat. No. 3,919,177 by washing the polymer with water.

In order to aid separation of the two phases, it is preferred that the system be quiescent. While some agitation appears to aid in the initial dissolution of the polymer into the liquid phase, agitation renders the separation of the two phases difficult. Thus, if agitation is employed, it is preferred to remove such agitation prior to attempting to separate the liquid phases.

The two liquid phases an be separated by any method known to those of ordinary skill in the art. For example, the lower phase can be separated from the upper in a mixer-settler apparatus including a means for detecting the boundary between the two phases based on viscosity, density or the like, with a port for removing the desired portion, whether upper or lower phase.

Upon separation, the higher molecular weight polymer-containing lower phase can be subjected to a process to recover the polymer; or additional polar organic compound and optionally additional promoter can be added to the lower phase to cause the formation of two new phases. In this manner, the high molecular weight polymer can be subjected to repeated extractions to remove as much of the lower molecular weight fraction as is desired or practicable.

In a like manner, the upper-phase can be subjected to a process to recover the lower molecular weight polymer, or additional polar organic compound and optionally promoter can be added to from two new phases. In this manner, one can recover polymer having the desired molecular weight and molecular weight distribution by repeating the invention process on a chosen phase.

The poly(arylene sulfide) polymer can be recovered from the lower liquid phase by any suitable method, for example, by vaporizing the polar organic compound/promoter mixture, or by lowering the temperature of the liquid phase to a point at which the polymer solidifies in the polar organic compound/promoter mixture, recovering the solid polymer by filtration or centrifugation.

The polymer produced by the invention method can be used neat or be mixed with various additives, fillers and reinforcement for use in varied applications, such as for the formation of fibers, injection molding compounds, or fiber-reinforced composites. The invention polymer has been found to be particularly useful as the polymer matrix in the preparation of continuous long fiber reinforced composites.

The following examples are intended to illustrate the invention but are not meant to limit the scope thereof.

EXAMPLES

In the following examples, the poly(phenylene sulfide) (PPS) flow rates were determined by the method of ASTM D 1238-86, Procedure B-Automatically Timed Flow Rate Procedure, Condition 316/5.0 modified to use a 5 minute preheat time, with the values of flow rate expressed in units of grams per ten minutes (g/10 min).

Polymer molecular weight determinations were done on a high temperature gel permeation chromatography (GPC) instrument utilizing a flame ionization detector. Determinations of PPS molecular weight distributions were carried out in 1-chloronaphthalene solutions at 220° C. GPC results are reported in terms of the weight average molecular weight (Mw) in units of grams per mole (g/mol) and are based on polystyrene standards.

The polymer thermal transitions were determined by differential scanning calorimetry (DSC) on a Perkin-Elmer DSC-7 Equipped with a data station. Polymer glass transition (Tg), crystallization from the glass (Tcc), and melting point (Tm) temperatures were determined in a nitrogen atmosphere at a heating rate of 20° C./min. Crystallization temperatures from the melt (Tmc) were determined by heating the sample to 320° C., holding for five minutes, and cooling the sample at 20° C./min.

Small scale fractionations were done in a glass reactor. In each experiment, the contents of the glass reactor were stirred with a magnetic stirrer during the heating period. The heating rate was about 1.4 C./min between 200° and 265° C. Once the desired temperature was reached, the stirrer was turned off and observations and/or phase height measurements were made without any agitation. Stirring was then reinitiated and the reactor was cooled.

Larger scale PPS fractionations were carried out in a one-liter, 316 stainless steel autoclave fitted with an anchor stirrer, a dip tube to remove an aliquot of the top fraction, and a bottom takeoff valve to remove an aliquot of the bottom fraction.

The PPS fractionations were done by heating the autoclave contents to the desired temperature with stirring, stopping the stirring, waiting ten minutes, and collecting samples (about 75 mL) from the top and bottom portions of the autoclave.

EXAMPLE I

Small glass reactor experiments were carried out to determine the effects of N-methyl-2-pyrrolidone (NMP), p-dichlorobenzene (DCB), and water on the observed melting (Tm-ob) and crystallization from the melt (Tmc-ob) temperatures of PPS. Temperature values in this example for the observed transitions are given special designations to distinguish them from the values determined by DSC. The PPS sample used in this and later examples is designated PPS-A and was produced with sodium acetate as a polymerization modifier. PPS-A had a flow rate of 188 g/10 min.

Figure 1:
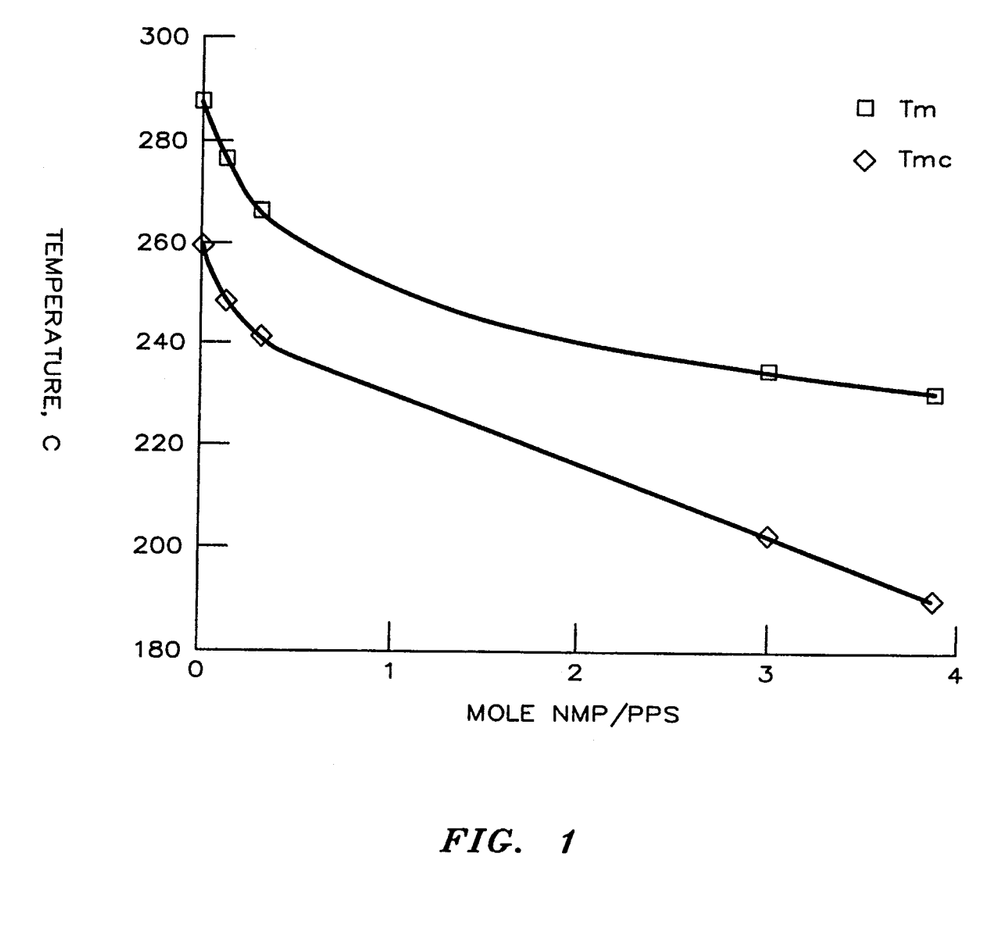
FIG. 1 graphically depicts the effect of varying the amount of the polar organic compound N-methyl-2-pyrrolidone used in the invention process on the melting temperature (Tm) and melt crystallization temperature (Tmc) of the resulting poly(phenylene sulfide) polymer.

The results of the glass reactor experiments are summarized in Table I. Increasing amounts of both NMP and DCB decrease the PPS Tm-ob and Tmc-ob values from the values of the pure PPS. Water has little effect on the melting and crystallization temperatures. The effect of NMP on the two polymer thermal transitions is more clearly shown in FIG. 1.

TABLE I

| Changes In PPS[a] Melting and Crystallization Temperatures | | | | |
|---|---|---|---|---|
| Sample No. | NMP, mole ratio[b] | DCB, mole ratio[b] | H$_2$O, mole ratio[b] | Tm-ob, °C. | Tmc-ob, °C. |
| 1 | 0.00 | — | — | 287 | 259 |
| 2 | 0.125 | — | — | 276 | 248 |
| 3 | 0.298 | — | — | 266 | 241 |
| 4 | 3.00 | — | — | 234 | 202 |
| 5 | 3.88 | — | — | 230 | 190 |
| 6 | — | 0.00 | — | 290 | 256 |
| 7 | — | 0.11 | — | 283 | 252 |
| 8 | — | 0.23 | — | 274 | 244 |
| 9 | — | 0.46 | — | 258 | 228 |
| 10 | — | — | 0.12 | 290 | 258 |
| 11 | — | — | 0.22 | 291 | 257 |
| 12 | — | — | 0.55 | 288 | 256 |

[a]PPS flow rate = 188 g/10 min
[b]Mole ratio per 1.00 mole of PPS repeating units

EXAMPLE II

Another set of small glass reactor experiments was carried out to determine the solubility of several salts in NMP and NMP/water mixtures. Relative amounts of water, salts and NMP are expressed in mole ratios, normalized relative to 1.00 mole of NMP. Solubilities were determined visually.

The observed solubilities at the test conditions are listed in Table II. Lithium acetate (LiOAc) and lithium benzoate (LiOBz) were readily soluble in pure NMP and did not require any water to dissolve them. Sodium acetate (NaOAc) did not appear to dissolve appreciably at temperatures up to 265° C. in pure NMP. When water was also present, the NaOAc did show increased solubility in NMP at temperatures between 215° C. and 265° C., although not all the NaOAc went into solution. Sodium benzoate (NaOBz) dissolved in NMP (sample 17) at 209° C. However, at higher temperatures a solid precipitate formed. Sodium chloride (NaCl) showed little solubility in NMP and water even when the mole ratio of NaCl to NMP was 0.00143.

TABLE II

| | | Salt Solubilities | | | |
|---|---|---|---|---|---|
| Sample No. | H$_2$O, mole ratio[a] | Salt mole ratio[a] | Salt | Temp., °C. | Observed Solubility |
| 13 | — | 0.086 | NaOAc | 265 | Little |
| 14 | 0.286 | 0.083 | NaOAc | 215-265 | Not all |
| 15 | — | 0.086 | LiOAc | 208 | All |
| 16 | 0.286 | 0.086 | LiOAc | 150 | All |
| 17 | — | 0.086 | NaOBz | 209 | All |
| 18 | — | 0.086 | LiOBz | 100 | All |
| 19 | 0.286 | 0.286 | NaCl | 265 | None |
| 20 | 0.286 | 0.017 | NaCl | 265 | None |
| 21 | 0.286 | 0.00286 | NaCl | 265 | Little |
| 22 | 0.286 | 0.00143 | NaCl | 265 | Little |

[a]Mole ratio per 1.00 mole of NMP

EXAMPLE III

This example examines the factors that control phase separation and the PPS distribution in mixtures of PPS, NMP, water, and salts. Since the volume of the lower, polymer-rich phase varies depending on the composition of the mixture, the phases were characterized by the amount of phase separation observed at 265° C. Using a melt density of 1.15 g/mL (determined by the method of ASTM D 1238-86) for PPS, the theoretical minimum lower phase volume for a true molten polymer phase was approximated. If the lower phase volume equaled this theoretical value, this represented 100 percent phase separation. If no liquid-liquid phase separation occurred, this constituted 0 percent phase separation. The phase separation data were determined in the small glass reactor using PPS-A and the results are displayed as ternary phase diagrams.

Figure 2:
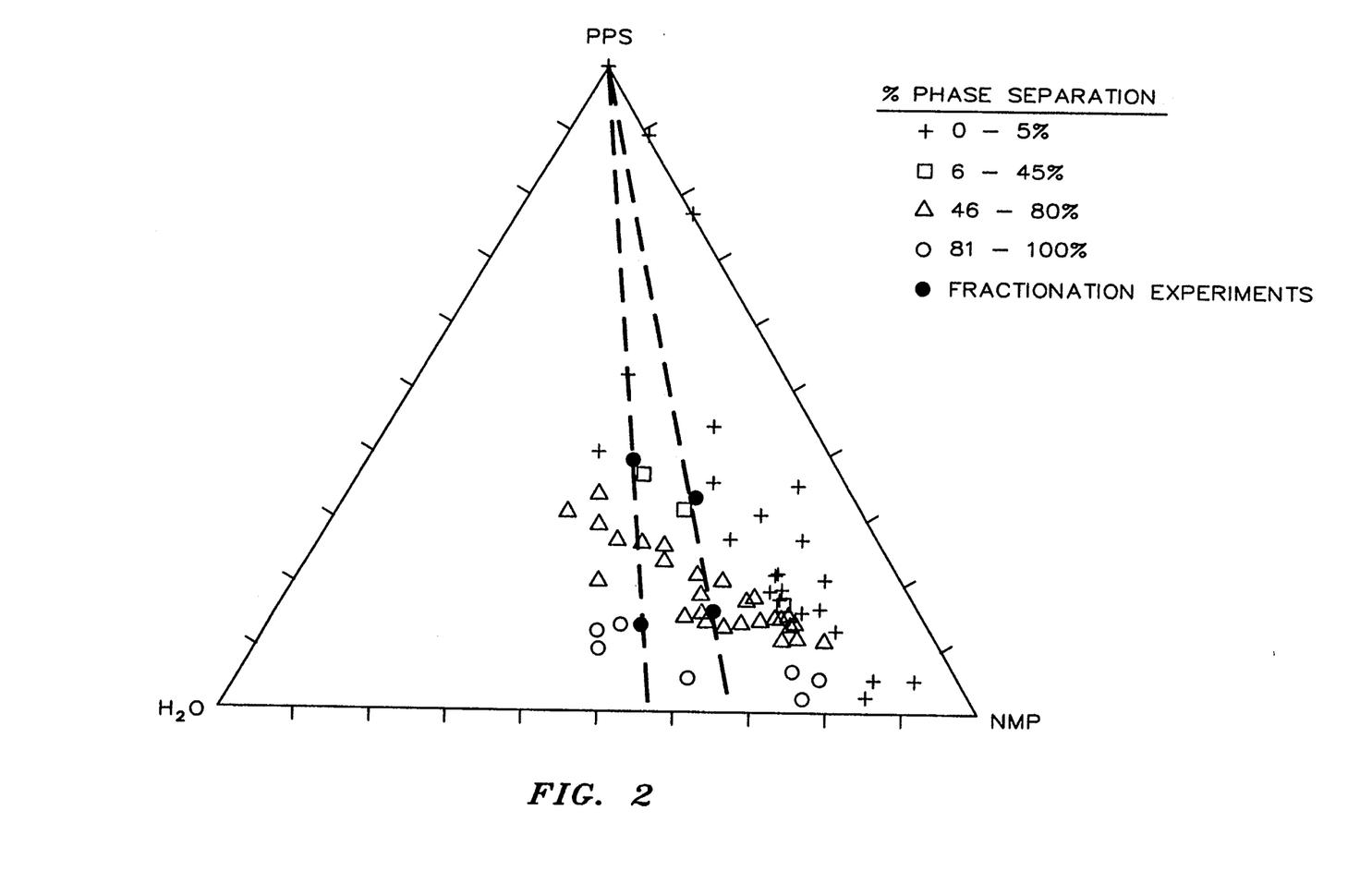
FIG. 2 graphically depicts the observed phase separation for a poly(phenylene sulfide) polymer dissolved in N-methyl-2-pyrrolidone using water as the sole promoter in the invention process.
Figure 3:
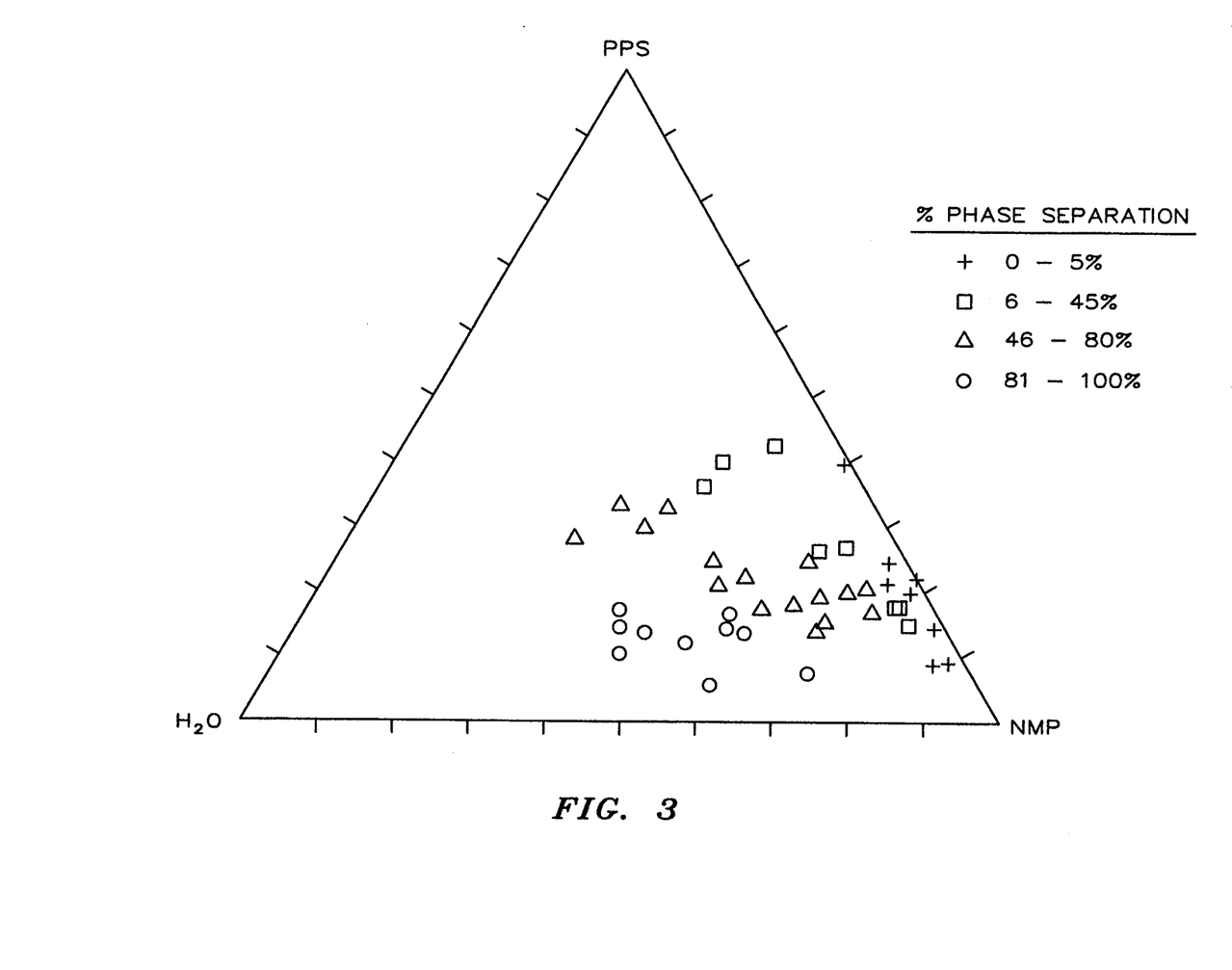
FIG. 3 graphically depicts the observed phase separation when a combination of water and sodium acetate is used as the promoter in the invention process.
Figure 4:
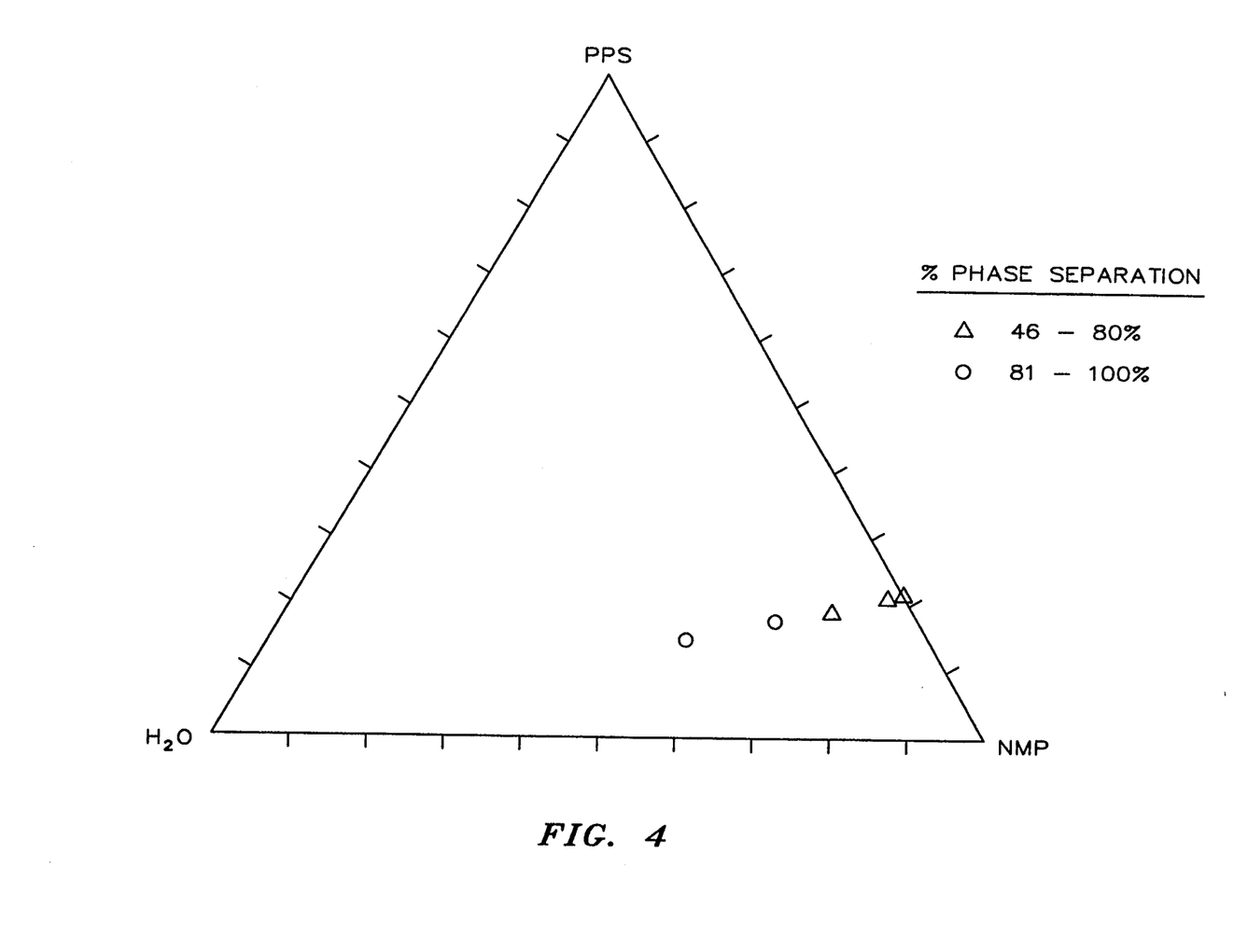
FIG. 4 graphically depicts the observed phase separation when a combination of water and sodium benzoate is used as the promoter in the invention process.
Figure 5:
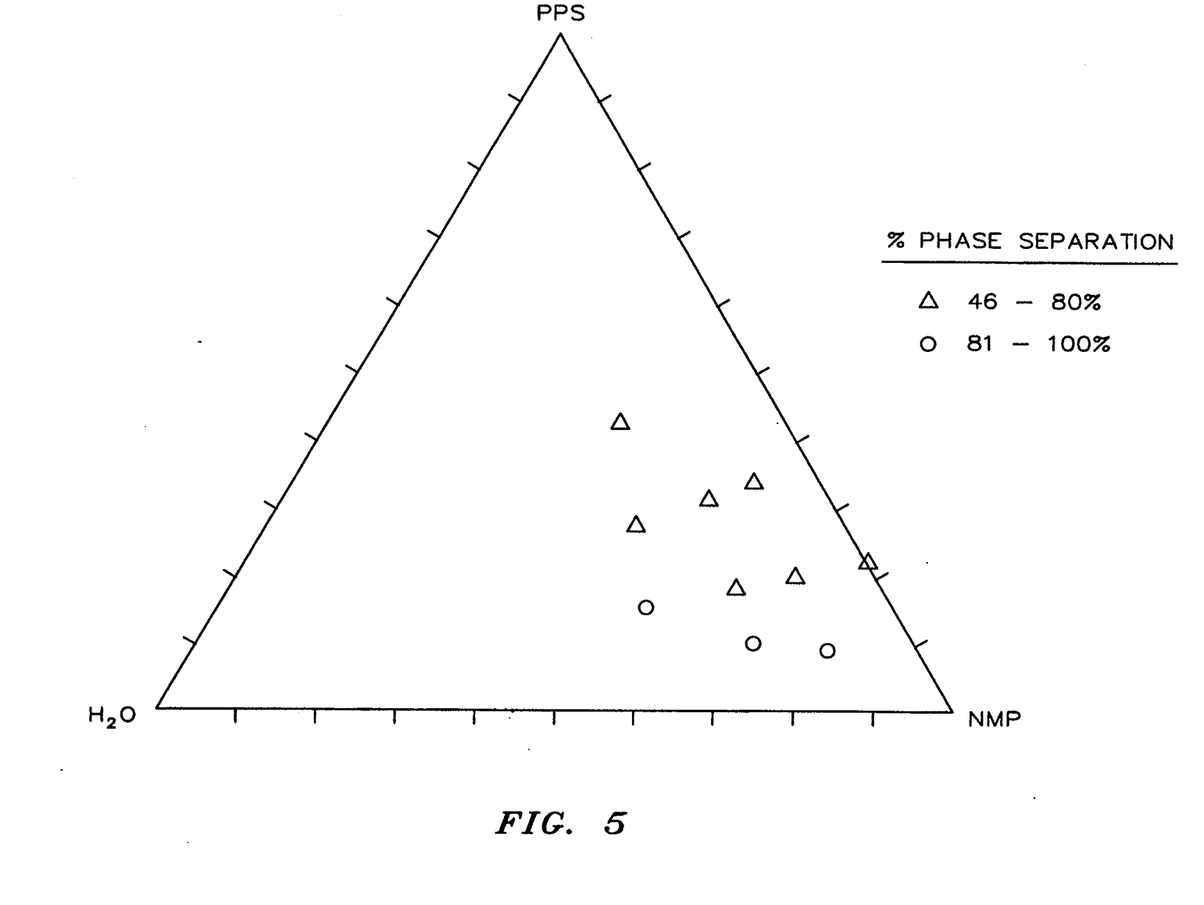
FIG. 5 graphically depicts the observed phase separation when a combination of water and lithium benzoate is used as the promoter in the invention process.
Figure 6:
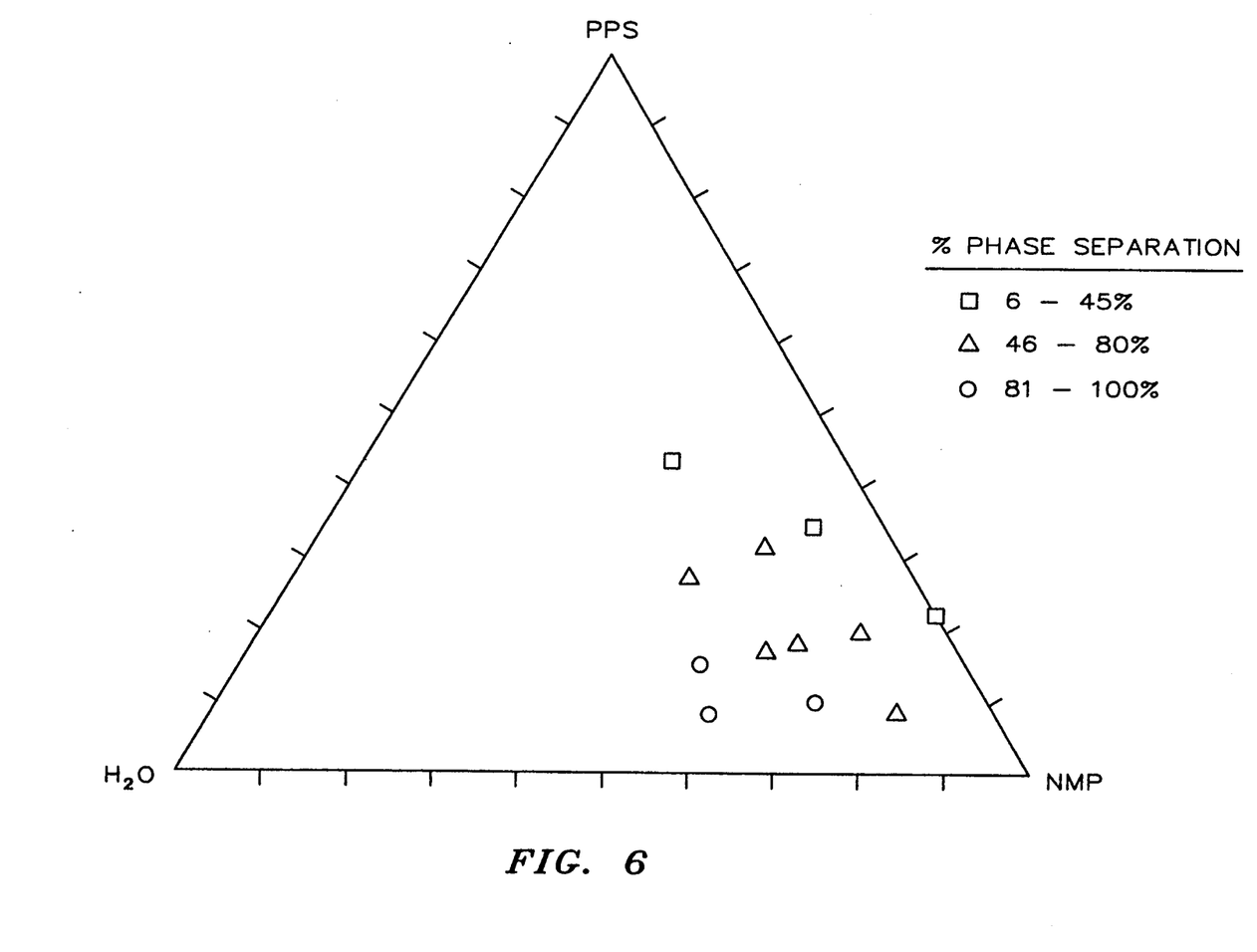
FIG. 6 graphically depicts the observed phase separation when a combination of water and lithium benzoate is used as the promoter in the invention process.

The observed phase separation in the absence of added salts is shown in FIG. 2. FIGS. 3 through 6 show the effect of added sodium acetate, sodium benzoate, lithium benzoate, and lithium acetate fall at the 0.3 mole per mole of PPS repeat unit level) on the phase separation.

EXAMPLE IV

This example demonstrates the effect of the PPS molecular weight on phase separation in NMP and water systems. Three PPS samples with different molecular weight were used in small glass reactor experiments. PPS-A (flow rate=188 g/10 min) was described in Example I. PPS-B was a lower molecular weight, linear, commercial sample (Mw about 20,000 g/mol) available from Phillips 66 Company as V-1 and was made without a polymerization modifier. PPS-C had a degree of polymerization of about 13 and a molecular weight of about 1400 g/mol.

Figure 7:
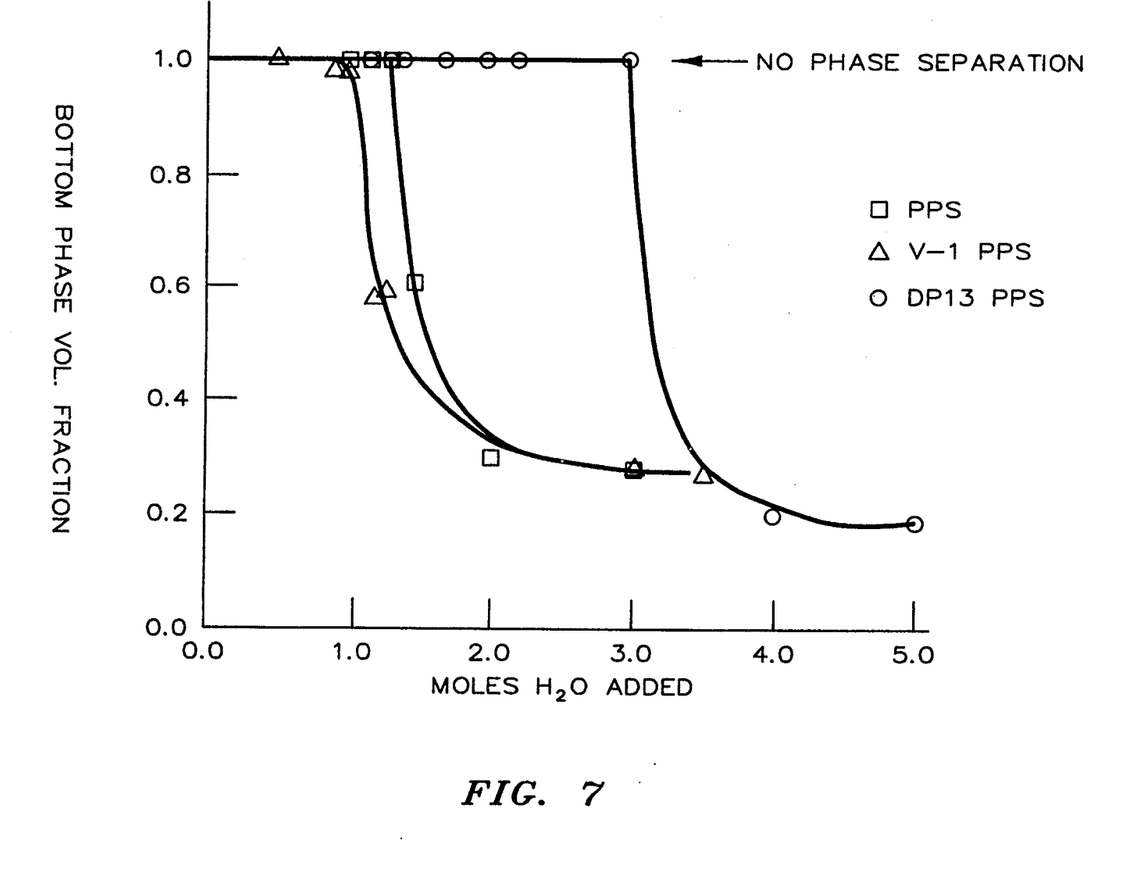
FIGS. 7 and 8 graphically depict the observed phase separation when the amount of water used as a promoter in the invention process varies for poly(phenylene sulfide) polymers having varied molecular weights.

The PPS phase separation behavior was determined at 265° C. in the small glass reactor. Relative amounts of PPS, NMP and water in this example are expressed in mole ratios, normalized to the moles of PPS repeat units present in the polymer being investigated. In this particular example, the mole ratios of NMP and PPS repeat units were held constant (PPS repeat units=1.00 and NMP=3.50) with the mole ratio of water to PPS repeat units varying from 0.0 to about 5.0. The results (FIG. 7) show that less water is needed to produce phase separation as the PPS molecular weight increases.

EXAMPLE V

In another example of the effect of PPS molecular weight on phase separation, a series of four PPS samples with different molecular weights were dissolved in NMP and various amounts of water in the small glass reactor. The PPS samples had weight average molecular weights of about 20,000, 36,000, 66,000, and 78,000 g/mol as determined by high temperature GPC.

Figure 8:
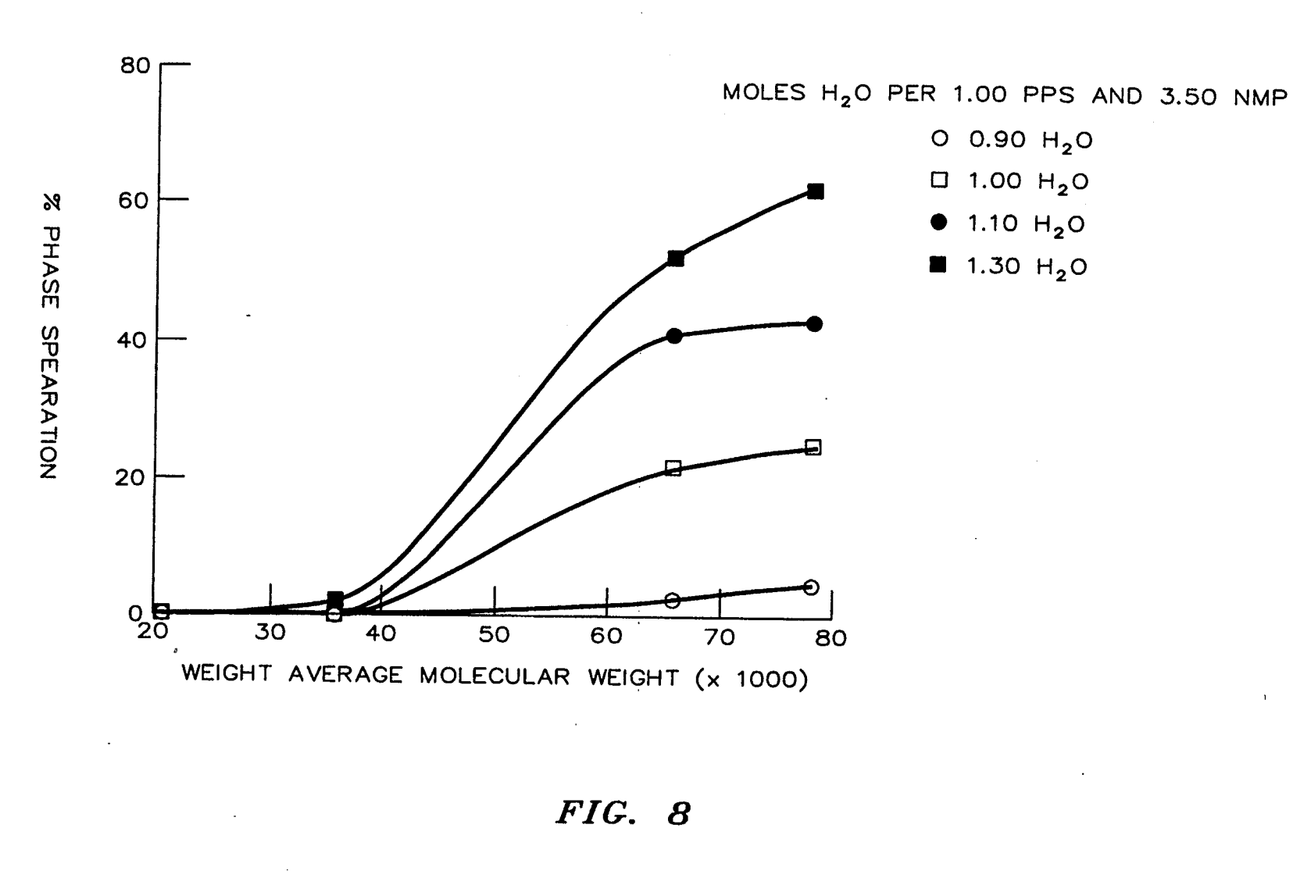

The amount of phase separation observed for mixtures of PPS, NMP and water having mole ratios of 1.00:3.50:0.9 to 1.3 (moles of PPS repeat units: moles of NMP: moles of water) at 265° C. was determined. As shown in FIG. 8, the amount of phase separation increased more for higher molecular weight samples of PPS as the amount of added water was increased. Note that the lowest level of water (0.9) gave little phase separation with all PPS samples.

EXAMPLE VI

Figure 9:
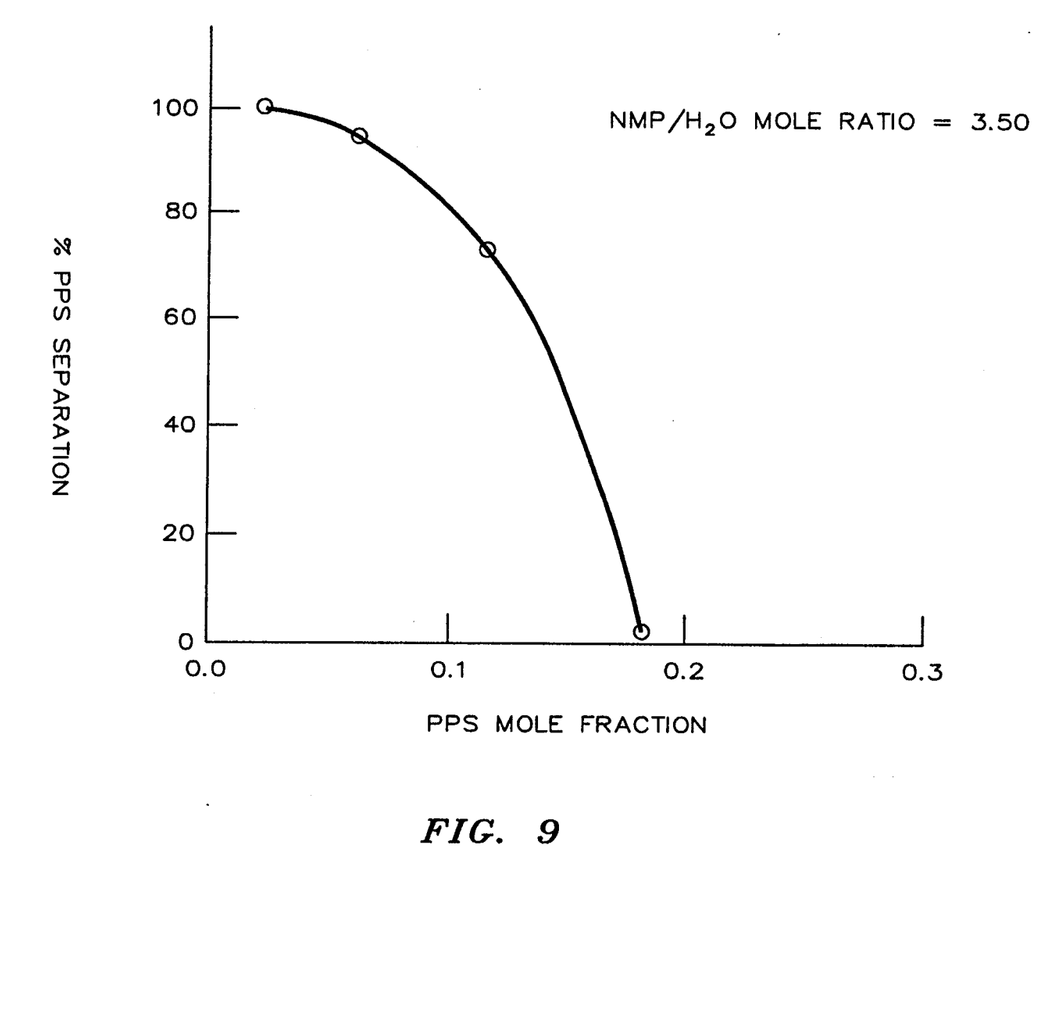
FIG. 9 graphically depicts the observed phase separation when the amount of poly(arylene sulfide) polymer varies with relation to the polar organic compound in the invention process.

The strong influence of the PPS concentration on phase separation is shown in this example. Various quantities of PPS-A in NMP-water mixtures (using a constant NMP to water mole ratio of 3.5/1) were examined visually at 265° C. in the small glass reactor. The results (FIG. 9) shows that increasing the PPS mole fraction reduces phase separation.

EXAMPLE VII

Figure 10:
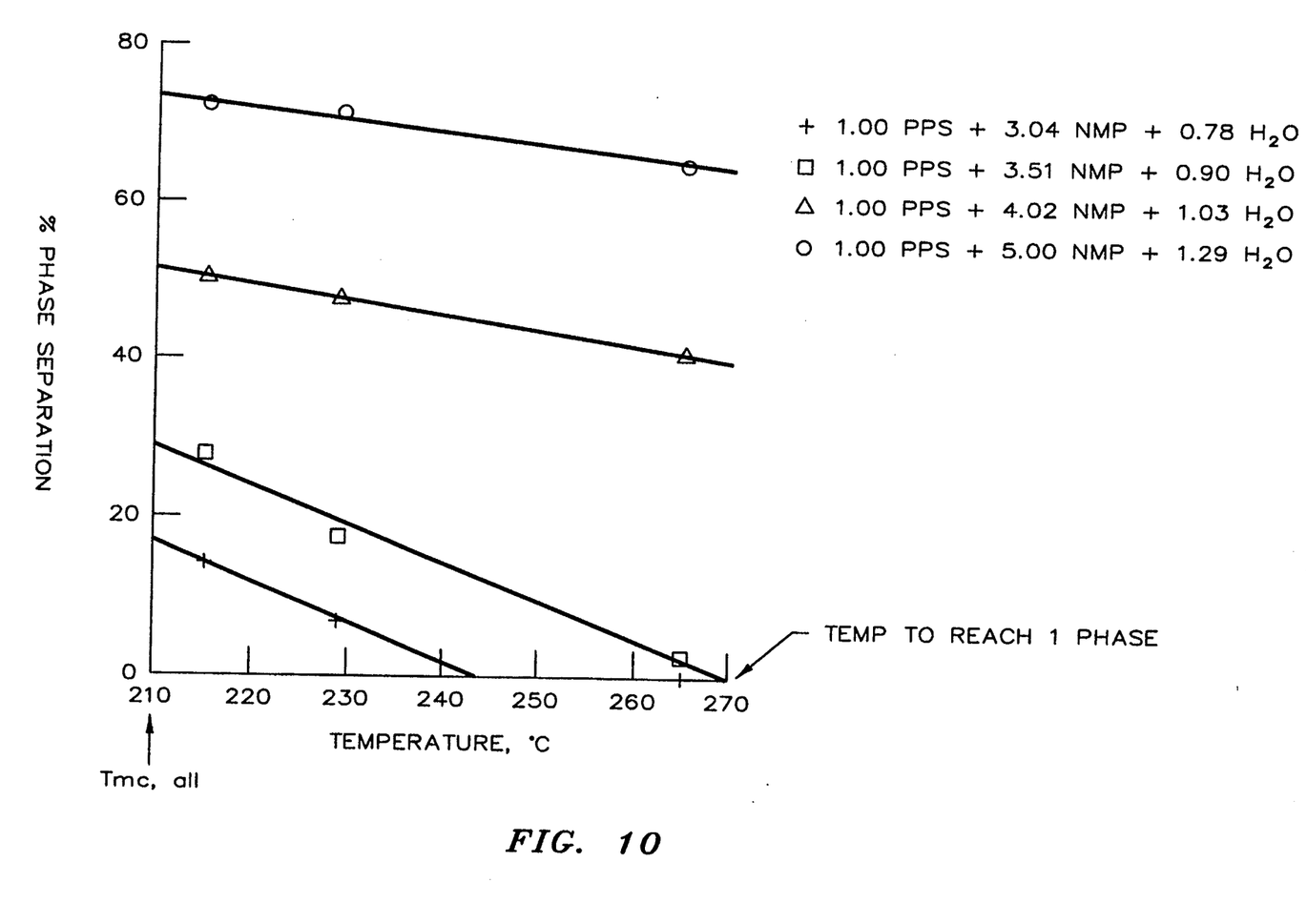
FIG. 10 graphically depicts the observed phase separation when the temperature is varied in the invention process.

This example demonstrates the effect of solution temperature on the PPS phase separation. The amount of observed phase separation of several mixtures of PPS-A, NMP, and water at several different temperatures was determined. As shown in FIG. 10, the degree of phase separation increases for a given PPS/NMP/water composition as the temperature decreases.

EXAMPLE VIII

Solution fractionations were carried out in a 1-L autoclave to show the effect on a PPS-NMP-water phase composition of changes in the water content in the absence of an added salt. Sample mixtures 23 and 24 were prepared using (quantities expressed as a mole ratio relative to the moles of PPS repeat units) 1.0 PPS-D, 3.50 NMP, and 2.00 water in mixture 23 or 3.00 water in mixture 24. PPS-D was produced with a sodium acetate modifier and a water quench recovery and had a flow rate of 248 g/10 min.

The PPS, NMP, water composition was deoxygenated by pressurizing the reaction mixture with 200 psi nitrogen and then releasing the pressure. The reaction mixture was subjected at room temperature to a total of 3 pressurize/release cycles. The reaction mixture was heated to 265° C. with slow agitation. After 30 minutes at 265° C., the agitation was halted and the dispersed liquid layers were allowed to coalesce into two discreet liquid phases in a quiescent state. The headspace of the autoclave was then pressurized with an additional 50 psig nitrogen gas.

The autoclave was equipped with a dip tube which was long enough to extend only into the upper liquid phase. This dip tube was connected to a small heated sample collection vessel. A high temperature valve was used to control the acquisition of the sample from the quiescent reaction mixture into the upper phase sample vessel. Analogously, the lower phase was sampled by opening a high temperature valve which was attached to a port in the bottom of the autoclave. The lower phase sample valve was connected to a small heated collection vessel.

The results of the analyses of the samples taken from upper and lower phases are shown in Table III. Most of the PPS is in the lower phase and relatively little PPS is in the upper phase. Increasing the water level from 2.0 moles of water per mole of PPS repeat unit in sample 23 to 3.0 moles of water per mole of PPS repeat unit in sample 24 increases the amount of PPS in the lower phase. The ratio of NMP to water is about the same in both phases of each mixture.

TABLE III

| | PPS Fractionation | | | |
|---|---|---|---|---|
| Sample No. | 23 | | 24 | |
| Reactor Charge[a] | | | | |
| PPS, mole ratio | 1.00 | | 1.00 | |
| NMP, mole ratio | 3.50 | | 3.50 | |
| $H_2O$, mole ratio | 2.00 | | 3.00 | |
| | wt % | mole Fraction | wt % | mole Fraction |
| Upper Phase | | | | |
| PPS | 4.048 | 0.027 | 2.612 | 0.016 |
| NMP | 88.132 | 0.653 | 85.490 | 0.557 |
| $H_2O$ | 7.820 | 0.319 | 11.898 | 0.427 |
| Lower Phase | | | | |
| PPS | 41.705 | 0.329 | 51.658 | 0.395 |
| NMP | 53.929 | 0.464 | 42.978 | 0.359 |
| $H_2O$ | 4.366 | 0.207 | 5.364 | 0.246 |

[a]Quantities in mole ratio to moles of PPS repeat units.

A GPC analysis of the PPS from the upper layer of sample 23 showed that the PPS was low molecular weight material. The solvent fractionation separates the PPS into a higher molecular weight PPS in the lower phase and a lower molecular weight PPS in the upper phase.

EXAMPLE IX

Another solution fractionation was done to demonstrate the effect of added carboxylate salt on the phase composition of a PPS-NMP-water mixture. Mixture 25 was prepared from 1.0 PPS-D, 3.5 NMP, 1.33 water, and 0.30 sodium acetate with the units being in terms of a mole ratio relative to the moles PPS repeat units in the polymer.

The PPS, NMP, water, sodium acetate mixture was charged to a 1-L autoclave. Dissolution of the PPS and sodium acetate in the NMP/water solvent system was accomplished according to the procedure described in Example VIII. Samples of the two liquid phases were obtained as described in Example VIII.

Table IV shows the results of the analyses of samples taken at 265° C. from both liquid phases from mixture 25. The presence of the sodium acetate resulted in the formation of two liquid phases with a large amount of the PPS in the lower phase with a relatively low level of water. About two-thirds of the sodium acetate was present in the upper layer.

TABLE IV

| | PPS Fractionation |
|---|---|
| Sample No. | 25 |
| Reactor Charge[a] | |
| PPS, mole ratio | 1.00 |
| NMP, mole ratio | 3.50 |

TABLE IV-continued

PPS Fractionation

| Sample No. | 25 | |
|---|---|---|
| H$_2$O, mole ratio | 1.33 | |
| NaOAc, mole ratio | 0.30 | |
| | wt % | Mole fraction[b] |
| Upper Phase | | |
| PPS | 3.063 | 0.024 |
| NMP | 83.970 | 0.721 |
| H$_2$O | 5.388 | 0.255 |
| Sodium Acetate | 7.579 | — |
| Lower Phase | | |
| PPS | 37.146 | 0.315 |
| NMP | 56.758 | 0.526 |
| H$_2$O | 3.126 | 0.159 |
| Sodium Acetate | 2.970 | — |

[a]Quantities in mole ratio to moles of PPS repeat units.
[b]The sodium acetate is not included in the calculated mole fractions so that a ternary phase diagram could be plotted for PPS/NMP/H$_2$O mixtures containing 0.30 moles sodium acetate per mole of PPS repeat unit in the polymer.

EXAMPLE X

This example demonstrates the difference in phase separation between a recovered PPS sample which is subjected to two-phase solution conditions using NMP, water and sodium acetate, and a finished polymerization mixture comprising PPS, NMP, water, sodium acetate and by-product sodium chloride. Sample 26 was a finished PPS polymerization mixture which was prepared in a 1-liter autoclave. The autoclave was charged with 1.0 sodium hydrosulfide, 1.01 sodium hydroxide, 2.5 NMP and 0.30 sodium acetate. The autoclave was flushed with nitrogen and all valves closed. Heating was accomplished with an electric furnace. When the temperature reached 151° C., the valve to the dehydration condenser was opened. A slow flow of nitrogen was purged through the headspace of the autoclave to assist dehydration. The first drop of condensate was received when the contents of the autoclave reached 158° C. 35.41 grams of condensate were collected. Dehydration was terminated when the contents of the autoclave reached 204° C. After dehydration was completed, 1.01 p-dichlorobenzene and 1.0 NMP were charged to the autoclave. The polymerization mixture was then heated to 235° C. for 1 hour and then to 265° C. for 3 hours. At the end of the 3 hour hold period at 265° C., the agitator was turned off and the reaction mixture allowed to sit in a quiescent state for 10 minutes. Samples of the reaction mixture were taken in a manner analogous to that described in Example VIII. Analyses of the two phases (Table V) showed that the upper phase contained more of the PPS than in sample 25. Similar GPC results were obtained for the PPS taken from upper and lower portions of the autoclave. Apparently, the presence of the sodium chloride by-product from the polymerization prevents a clean phase separation as is observed from an essentially sodium chloride-free PPS two-phase solution system.

TABLE V

Fractionation of Polymerization Mixture[a]

| Sample No. | 26 | |
|---|---|---|
| | wt % | Mole fraction[b] |
| Upper Phase | | |
| PPS | 10.610 | 0.085 |
| NMP | 77.634 | 0.679 |
| H$_2$O | 4.903 | 0.236 |
| Sodium acetate | 6.853 | — |
| Lower Phase | | |
| PPS | 28.780 | 0.241 |
| NMP | 62.782 | 0.574 |
| H$_2$O | 3.661 | 0.184 |
| Sodium acetate | 4.776 | — |

[a]Mixture at end of PPS polymerization without any other separation or purification.
[b]The sodium acetate is not included in the calculated mole fractions.

EXAMPLE XI

Another solution fractionation was carried out to demonstrate the phase separation of PPS and NHP with lithium benzoate and no added water. Sample 27 was prepared in the 1-L autoclave from 1.0 PPS-D, 3.50 NMP, and 0.75 lithium benzoate with the quantities expressed as a mole ratio to relative to moles of PPS repeat units in the polymer. This mixture was heated to 265° C. and observed to separate into two liquid phases. Both liquid phases were sampled as in Example VIII and analyzed.

The results of the analyses are summarized in Table VI. Most of the PPS was present in the lower phase and most of the carboxylate salt was in the upper phase. A PPS fractionation can be carried out in the absence of water if lithium benzoate is used.

TABLE VI

PPS Fractionation

| Sample No. | 27 | |
|---|---|---|
| Reactor Charge[a] | | |
| PPS, mole ratio | 1.0 | |
| NMP, mole ratio | 3.50 | |
| H$_2$O, mole ratio | 0.0 | |
| LiOBz, mole ratio | 0.75 | |
| | wt % | Mole fraction[b] |
| Upper Phase | | |
| PPS | 6.117 | 0.072 |
| NMP | 72.058 | 0.928 |
| H$_2$O | 0.0 | 0.0 |
| LiOBz | 21.825 | — |
| Lower Phase | | |
| PPS | 38.008 | 0.408 |
| NMP | 50.554 | 0.592 |
| H$_2$O | 0.0 | 0.0 |
| LiOBz | 11.438 | — |

[a]Quantities in mole ratio to PPS.
[b]The lithium benzoate is not included in the calculated mole fractions so that a ternary phase diagram could be plotted for PPS/NMP/H$_2$O mixtures containing 0.75 moles of lithium benzoate per mole of PPS repeat unit in the polymer.

EXAMPLE XII

This example demonstrates the effect of acidic treatment on the thermal transitions of a solution fractionated PPS. A high molecular weight linear PPS resin (designated sample 28) with a melt flow of 170 g/10 minutes from Phillips 66 Company was used as the starting polymer. Polymer sample 28 was solution fractionated by dissolving the polymer in an NMP/water mixture having the following mole ratios: 7.55 moles of NMP and 3.13 moles of water per 1.0 mole of PPS repeat units in the polymer. The PPS/NMP/water reaction mixture was charged to the autoclave, deoxygenated and heated to 265° C. Upon reaching 265° C., the agitation was stopped and the 2 liquid phases were allowed to coalesce. The polymer from the polymer-rich lower phase was collected and washed with distilled water to remove residual NMP. The product obtained from this solution fractionation (designated sample 29) had a melt flow of 69 g/10 min. A portion of sample 29 was subjected to an acidic treatment by dispersing 500 grams of sample 29 in 3500 grams of distilled water which contained 10 grams of glacial acetic acid. This reaction mixture was charged to an autoclave, deoxygenated and heated to 225° C. The mixture was held at 225° C. for 45 minutes and then cooled. The polymer was recovered by filtration and rinsed in hot distilled water three times. The product of this acidic treatment was designated sample 30.

The DSC thermal transition of these three samples are summarized in Table VII. Solution fractionation and later acid treatment of polymer sample 28 results in a minor increase in the glass transition (Tg), an increase in the crystalline melting point (Tm), and a faster crystallization rate as demonstrated by higher Tmc values and lower Tcc values for the fractionated sample 29 and a much faster crystallization rate for the fractionated and acid treated sample 30.

TABLE VII

PPS Fractionation and Acid Treating

| Type | Sample No. | | |
|---|---|---|---|
| | 28 Parent | 29 Fractionated | 30 Fractionated & Acid Treated |
| Flow rate, g/10 min | 170 | 69 | 82 |
| Tg, °C. | 92 | 93 | 94 |
| Tcc, °C. | 152 | 143 | 128 |
| Tm, °C. | 280 | 289 | 290 |
| Tmc, °C. | 195 | 208 | 228 |

EXAMPLE XIII

This example demonstrates that a high molecular weight PPS polymer can be fractionated to produce a material that is essentially inert to an acid treatment. A starting high molecular weight PPS polymer, sample 31, was acid treated to show that the acid treatment results in changes in the thermal transition of PPS. When sample 31, having a melt flow before acid treatment of 35 g/1.0 min was acid treated with 0.3 weight percent acetic acid at 225° C. for 45 minutes in a manner analogous to that described for sample 30 in Example XII, the product, sample 32, had a melt flow of 46 g/10 min. The Tcc decreased and the Tmc increased for sample 32 relative to the corresponding thermal transitions of sample 31, indicating an increase in the crystallization rate of the polymer.

Another high molecular weight PPS polymer, sample 33, having a melt flow of 38 g/10 min, was solution fractionated in a manner analogous to that described for the preparation of sample 29 in Example XII. Sample 33 was solution fractionated by dissolving the 27.0 grams of sample 33 in 687 grams of NMP and 32.3 grams of distilled water. This reaction mixture was charged to an autoclave, deoxygenated and heated to 260° C. Upon reaching 260° C., the agitation was stopped and the two liquid phases allowed to settle. After approximately 7 minutes in the quiescent state, the reaction mixture was allowed to cool. When the temperature on the reaction mixture reached approximately 90° C., the autoclave was opened and the lower polymer-rich liquid phase was collected. The polymer-rich phase was washed with hot distilled water to remove residual NMP. The polymer obtained from this solution fractionation (designated sample 34) had a melt flow of 7.7 g/10 min. A portion of sample 34 was subjected to an acidic treatment by dispersing 7.94 grams of sample 34 in 400.0 grams of distilled water which contained 2.00 grams of glacial acetic acid. This reaction mixture was charged to an autoclave, deoxygenated and heated to 235° C. for 25 minutes and then cooled. The polymer was recovered by filtration and rinsed in hot deionized water three times. The product of this acidic treatment was designated sample 35. The melt flow of sample 35 was 7.8 g/10 min.

As shown in Table VIII, the glass transition temperature and crystalline melting temperature of sample 31 were not significantly changed by an acidic treatment. The Tcc decrease and Tmc increase observed for sample 32 is characteristic of more rapid crystallization. Alternatively, the acidic treatment received by sample 35 shows that this acidic treatment is ineffectual in causing changes in the thermal transition of PPS. The thermal transitions for samples 34 and 35 are summarized in Table VIII and show essentially no change upon acidic treatment.

TABLE VIII

PPS Fractionation and Acid Washing

| Type | Sample No. | | | | |
|---|---|---|---|---|---|
| | 31 Parent | 32 Acid Treated | 33 Parent | 34 Fractionated | 35 Fractionated & Acid Treated |
| Flow rate, g/10 min | 35 | 46 | 38 | 7.7 | 7.8 |
| Tg, °C. | 95 | 93 | 95 | 96 | 97 |
| Tcc, °C. | 146 | 132 | 149 | 130 | 131 |
| Tm, °C. | 286 | 286 | 286 | 283 | 284 |
| Tmc, °C. | 214 | 232 | 211 | 214 | 217 |

EXAMPLE XIV

This example describes the preparation of fiber-reinforced composites from two PPS samples prepared according to the invention method.

First, portions of Sample 29 and Sample 30 were ground in an air-mill in order to reduce the particle size of the polymers. A 475 g portion of each of Sample 29 polymer and Sample 30 polymer were suspended in 2500 g of distilled water and 3.0 g Neodol 91-6, a surfactant, to form an addition bath. A 175 g portion of each of the polymers was suspended in 2650 g distilled water and 2.5 g Neodol 91-6 to form the main bath. Tows of Hercules AS-4 carbon fiber, lot 748-4K were pulled through the bath at a tension of approximately 200 g/tow. Make up slurry from the addition bath was added at a rate of 15.3 mL/min. The resulting 1 inch tapes were spliced and consolidated to form 10" tapes.

The 10" tapes were laid-up to form 10" by 10", 14 ply unidirectional laminates using a PDP press mold with a FK-800 release having a single sleeve. The molding was performed at 329° C. (625° F.) at a pressure of 200 psi for 20 minutes then the laminates were cold pressed at 10° C. (50° F.) and 250 psi and held until cool. The composites formed from sample 29 and 30 polymers, designated A and B respectively, were tested for mechanical properties. The composites prepared from the invention polymers were compared to a composite designated AC-40-60, which was prepared in a similar manner from a branched poly(phenylene sulfide) polymer having an ash content of approximately 0.6 and a nominal melt flow of 30–50 g/10 minutes. The results are shown in Table IX below.

TABLE IX

|  |  | Composite A[a] | Composite B[a] | AC-40-60[a] |
|---|---|---|---|---|
| Longitudinal Tensile (ASTM D3039) | Strength (ksi) | 238.78 | 238.26 | 238 |
|  | Modulus (msi) | 13.50 | 13.13 | 17.8 |
|  | Elongation (%) | 1.47 | 1.45 | —[b] |
| Longitudinal Flexural (ASTM D790) | Strength (ksi) | 207.78 | 219.78 | 229 |
|  | Modulus (msi) | 14.92 | 15.16 | 15.6 |
|  | Strain (%) | 1.36 | 1.42 | —[b] |
|  | Deflection (in.) | 0.140 | 0.152 |  |
| Transverse Tensile (ASTM D3039) | Strength (ksi) | 9.14 | 10.46 | 4.2 |
|  | Modulus (msi) | 1.11 | 1.12 | 1.36 |
|  | Elongation (%) | 0.83 | 0.99 | —[b] |
| Transverse Flexural (ASTM D790) | Strength (ksi) | 14.54 | 17.54 | 6.4 |
|  | Modulus (msi) | 0.65 | 0.69 | 1.09 |
|  | Strain (%) | 1.41 | 1.66 | —[b] |
|  | Deflection (in.) | 0.036 | 0.045 | —[b] |
| 4-Point Shear (ASTM D790) | Strength (ksi) | 12.20 | 10.60 | 6.45 |

[a]As noted in Table IX, the fractionated polymers exhibit substantially improved traverse tensile, flexural and 4-point shear properties without degrading longitudinal mechanical strengths or moduli. The fractionation has the most pronounced effect on improving properties, with the fractionation in conjunction with acid washing showing only marginal improvement.
[b]Not measured While this invention has been described in detail for the purpose of illustration, it is not meant to be limited thereby, but is intended to cover all changes and modifications within the spirit and scope thereof.

That which is claimed is:

1. A method for selectively removing a lower molecular weight fraction from a poly(arylene sulfide) polymer comprising a lower molecular weight fraction and a higher molecular weight fraction, which method comprises:
    a) contacting said polymer with a polar organic compound, and a promoter selected from the group consisting of water, an alkali metal salt, and mixtures thereof, wherein said promoter is soluble in said polar organic compound, at a temperature sufficient for the formation of a less dense polymer-lean liquid phase comprising a portion of said lower molecular weight fraction and a more dense polymer-rich liquid phase comprising essentially all of the higher molecular weight fraction of said poly(arylene sulfide) polymer;
    b) separating and thus removing said polymer-lean phase from said polymer-rich phase; and
    c) recovering said higher molecular weight fraction of said polymer from said polymer-rich phase.

2. A method according to claim 1 wherein said poly(arylene sulfide) polymer is poly(phenylene sulfide).

3. A method according to claim 2 wherein said poly(arylene sulfide) polymer comprising a lower molecular weight fraction and a higher molecular weight fraction has a melt flow rate less than about 3000 g/10 min when measured according to ASTM D-1238 condition 315/5.

4. A method according to claim 2 wherein said promoter comprises water and the molar ratio of said water to moles of sulfur in said poly(arylene sulfide) polymer is in the range of about 0.2:1 to about 10:1.

5. A method according to claim 4 wherein said promoter comprises an alkali metal carboxylate present in an amount in the range of about 0.01 to about 2 moles of alkali metal carboxylate per mole of sulfur in said poly(arylene sulfide) polymer.

6. A method according to claim 4 wherein said temperature of step a) is in the range of about 200° to about 300° C.

7. A method according to claim 1 which further comprises after the step b) separation of the polymer-lean phase from the more dense polymer-rich liquid phase, adding an amount of polar organic compound with or without a promoter to the polymer-rich phase under conditions such that a second less dense polymer-lean liquid phase is formed; then separating said second less dense polymer-lean liquid phase from said more dense polymer-rich liquid phase, prior to performing step c).

8. A method according to claim 1 which further comprises after the step b) separation of the polymer-lean phase from the more dense polymer-rich phase, adding an amount of polar organic compound with or without a promoter to the polymer-lean phase under conditions such that a less dense phase relative to said polymer-lean phase is formed; then separating and thus removing said less dense phase relative to said polymer-lean phase from said polymer-lean phase; and
    recovering said poly(arylene sulfide) polymer from said polymer-lean phase.

9. A method for selectively producing a poly(arylene sulfide) polymer having a desired molecular weight distribution, which method comprises:
    a) contacting a poly(arylene sulfide) polymer comprising a lower molecular weight fraction and a higher molecular weight fraction with a polar organic compound and a promoter selected from the group consisting of alkali metal salts, water and mixtures thereof, wherein said promoter is soluble in said polar organic compound, under conditions sufficient for the formation of a less dense polymer-lean liquid phase comprising a first portion of said lower molecular weight fraction and a more dense polymer-rich liquid phase comprising essentially all of said lower molecular weight fraction and a second portion of said lower molecular weight fraction;
    b) separating the polymer-lean phase from the polymer-rich phase;
    c) repeating steps a) and b) one or more times using the polymer-lean liquid phase produced in step a), or the polymer-rich liquid phase produced in step a), or each of said phases separately; and
    d) recovering said poly(arylene sulfide) polymer having a desired molecular weight distribution from said phase or phases employed in step c).

10. A poly(arylene sulfide) polymer produced by the method of claim 9.

* * * * *